(12) United States Patent
Baghernejad et al.

(10) Patent No.: US 10,124,298 B1
(45) Date of Patent: Nov. 13, 2018

(54) HIGHLY SELECTIVE, ULTRALIGHT, ELECTRO-SPUN FILTER MEDIA FOR SEPARATING OIL-WATER MIXTURES

(71) Applicant: The University of Tulsa, Tulsa, OK (US)

(72) Inventors: Lida Baghernejad, Tulsa, OK (US); Erin Iski, Tulsa, OK (US); Ram S. Mohan, Tulsa, OK (US); Ovadia Shoham, Tulsa, OK (US); Seyi Odueyungbo, Escravos (NG)

(73) Assignee: The University of Tulsa, Tulsa, OK (US)

( * ) Notice: Subject to any disclaimer, the term of this patent is extended or adjusted under 35 U.S.C. 154(b) by 180 days.

(21) Appl. No.: 15/203,514

(22) Filed: Jul. 6, 2016

Related U.S. Application Data (60) Provisional application No. 62/189,571, filed on Jul. 7, 2015.

(51) Int. Cl.
  *D01D 5/00* (2006.01)
  *D01F 8/02* (2006.01)
  (Continued)

(52) U.S. Cl.
  CPC ....... *B01D 69/127* (2013.01); *B01D 67/0002* (2013.01); *B01D 67/0083* (2013.01); *B01D 67/0095* (2013.01); *B01D 69/02* (2013.01); *B01D 71/12* (2013.01); *B01D 2323/04* (2013.01); *B01D 2323/12* (2013.01);
  (Continued)

(58) Field of Classification Search
  None
  See application file for complete search history.

(56) References Cited

U.S. PATENT DOCUMENTS

| | | | | |
|---|---|---|---|---|
| 4,231,768 A | * | 11/1980 | Seibert | A61L 9/00 210/DIG. 5 |
| 5,453,540 A | * | 9/1995 | Dams | C08G 18/6279 427/389 |

(Continued)

OTHER PUBLICATIONS

An in situ polymerization for superhydrophobic and superoleophilic CA membranes.pdf—"An in situ polymerization approach for the synthesis . . . "—Shang, Yanwei et al—Nanoscale, 2012, 4, 7847 (Year: 2012).*

(Continued)

*Primary Examiner* — Krishnan S Menon
*Assistant Examiner* — Bradley R Spies
(74) *Attorney, Agent, or Firm* — Head, Johnson, Kachigian & Wilkinson, PC (57) ABSTRACT

A filter medium for oil-water separation, the filter medium being a composite, nanofibrous mat formed from electro-spinning a single solution of one natural polymer and one synthetic polystyrene polymer together, where fibers of the natural polymer are reinforced by fibers of the synthetic polystyrene polymer. The nanofibrous mat may initially be hydrophobic and oleophilic, making it a suitable filter medium for separating oil from oil-water mixtures. The mat may be treated with one or more surfactants to change the surface wettability of the mat to hydrophilic and oleophobic for separating water from oil-water mixtures or to hydrophobic and oleophobic for separating oil and water droplets from wet gas.

22 Claims, 10 Drawing Sheets
(10 of 10 Drawing Sheet(s) Filed in Color)

(51) Int. Cl.
*D01F 8/10* (2006.01)
*B01D 69/02* (2006.01)
*B01D 69/12* (2006.01)
*B01D 71/12* (2006.01)
*B01D 67/00* (2006.01)

(52) U.S. Cl.
CPC ...... *B01D 2323/39* (2013.01); *B01D 2325/38* (2013.01); *D01D 5/0038* (2013.01); *D01F 8/02* (2013.01); *D01F 8/10* (2013.01); *D10B 2321/121* (2013.01); *D10B 2505/04* (2013.01)

(56) References Cited

U.S. PATENT DOCUMENTS

| | | | |
|---|---|---|---|
| 2007/0141940 A1* | 6/2007 | Baychar | A41D 31/0038 442/328 |
| 2012/0234748 A1* | 9/2012 | Little | D04H 1/435 210/488 |
| 2012/0240369 A1* | 9/2012 | Capparelli Mattoso | D01D 5/003 28/104 |
| 2012/0292252 A1* | 11/2012 | Chase | B01D 46/003 210/634 |
| 2013/0115457 A1* | 5/2013 | Haynie | D01D 5/003 428/401 |
| 2014/0296123 A1* | 10/2014 | Sworen | C08L 33/10 510/299 |

OTHER PUBLICATIONS phobol ultraphil.pdf—"DuPont Capstone repellent and stain release products . . . "—DuPont, Nov. 23, 2010 (Year: 2010).*
Studying the Characteristic of PS modified CA Membrane.pdf—"Stuydying the Characteristic of Polystyrene-Modified Cocoa . . . "—Okolo, P. O. et al—Bayero Journal of Pure and APplied Sciences, 6(1): 179 (Year: 2013).*
Qian Yang, Nadia Adrus, Falk Tomicki and Mathias Ulbricht Composites of Functional Polymeric Hydrogels and Porous Membranes; vol. 21, pp. 2783-2811 Received Jul. 12, 2010; Accepted Nov. 5, 2010 Journal of Materials Chemistry.
M. Bognitzki, W. Czado, T. Frese, A. Schaper, M. Helwig, M. Steinhart, A. Greiner, and J.H. Wendorff; Nanostructured Fibers Via Electrospinning; Advanced Materials; Wiley-VCH Verlag GmbH, D-69469 Weinheim, 2001 0935-9648/01/0101-0070 $17.50+.50/0 vol. 13, pp. 70-72.
G. Bogoeva-Gaceva, M. Avella, M. Malinconico, A. Buzarovska, A. Grozdanov, G. Gentile, and M.E. Errico; Natural Fiber Eco-Composites; Published online in Wiley InterScience (www.interscience.wiley.com); © 2007 Society of Plastic Engineers, Polymer Composites, pp. 98-107.
A.K. Mohanty, A. Wibowo, M. Misra and L.T. Drzal Development of Renewable Resource-Based Cellulose Acetate Bioplastic: Effect of Process Engineering on the Performance of Cellulosic Plastics; May 1, 2003; Polymer Engineering and Science; vol. 43, pp. 1151-1161; ISSN: 0032-3888 www.thefreelibrary.com/_/print/PrintArticle.aspx?id=102553504.
Tu Cheng-Wei, Tsai Chia-Hua, Chih-Feng Wang, Shiao-Wei Kuo and Feng-Chih Chang Fabrication of Superhydrophobic and Superoleophilic Polystyrene Surfaces by a Facile One-Step Method; Macromolecular Rapid Communications 2007, vol. 28, pp. 2262-2266; DOI: 10.1002/marc200700447; © 2007 Wiley-VCH Verlag GmbH & Co. KGaA, Weinheim www.mrc-journal.de.

Min Wook Lee, Seongpil An, Sanjay Latthe, Changmin Lee, Seungkway Hong and Sam Yoon Electrospun Polystyrene Nanofiber Membrane with Superhydrophobicity and Superoleophilicity for Selective Separation of Water and Low Viscous oil; 2013, ACS Publications 2013 © American Chemical Society; Applied Materials & Interfaces; Received: Jun. 25, 2013; Accepted: Oct. 2, 2013; Published: Oct. 3, 2013; vol. 5, pp. 10597-10604; www.acsami.org.
Ramakrishna, S., et al.; An Introduction to Electrospinning and Nanofibers 1. s.l.; World Scientific Publishing Co. Pte Ltd.; May 2005; http://0-web.b.ebscohost.com.library.utulsa.edu/ehost/detail/detail?sid=e46ff3c3-d97c-4079-9f85-b9a79e1b0a99%0sessionmgr104&vid=1&hid=125&bdata=JnNpdGU9ZWhvc3QtbGl2ZQ%3d%3d#db=e000xna&AN=148571.
R.S. Barhate and Seeram Ramakrishna Nanofibrous Filtering Media: Filtration Problems and Solutions From Tiny Materials ScienceDirect; Journal of Membrane Science vol. 296, pp. 1-8; Mar. 2007 www.sciencedirect.com.
A. Buer, S.C. Ugbolue, and S.B. Warner; Electrospinning and Properties of Some Nanofibers Department of Textile Sciences, University of Massachussets, Dartmouth, MA 02747, U.S.A. Textile Res. J. 71(4), 323-328, vol. 71, Apr. 2001 www.trj.sagepub.com.
Colin R. Crick, James A. Gibbins and Ivan P. Parkin; Superhydrophobic Polymer-Coated Copper-Mesh; Membranes for Highly Efficient Oil—Water Separation Journal of Materials Chemistry A, vol. 1, pp. 5943-5948, Received Feb. 11, 2013, Accepted Mar. 22, 2013; This Journal is © The Royal Society of Chemistry 2013; www.rsc.org/MaterialsA.
Audrey Frenot, Maria Walenius Henriksson, and Pernilla Walkenstrom Electrospinning of Cellulose-Based Nanofibers; Journal of Applied Polymer Science; vol. 103, 1473-1482 (2007), © 2006 Wiley Periodicals, Inc.; Published online in Wiley InterScience (www.interscience.wiley.com).
Xiaofeng Huang and Teik-Thye Lim *(School of Civil and Environmental Engineering) Performance and Mechanism of a Hydrophobic-Oleophilic Kapok Filter for Oil-Water Separation 2006, Desalination, vol. 190, pp. 295-307 www.elsevier.com/locate/desal.
Ausra Mazeikiene, Rasa Vaiskunaite and Vaidotas Vaisis Oil Removal From Runoff With Natural Sorbing Filter Filler © 2014, Elsevier Ltd. All rights reserved; Journal of Environmental Management, vol. 141, pp. 155-160 www.elsevier.com/locate/jenvman.
H. Ohya, J.J. Kim, A. Chinen, M. Aihara, S.I. Semenova, Y. Negishi, O. Mori and M. Yasuda Effects of Pore Size on Separation Mechanisms of Microfiltration of Oily Water, Using Porous Glass Tubular Membrane Journal of Membrane Science, vol. 145, pp. 1-14 © 1998 Elsevier Science B.V. All rights reserved.
Chi-Feng Wang and Sheng-Jhih Lin Robust Superhydrophobic/Superoleophilic Sponge for Effective Continuous Absorption and Expulsion of Oil Pollutants from Water; Department of Materials Science and Engineering, I-Shou University, Kaohsiung 840, Taiwan ACS Applied Materials & Interfaces, vol. 18, pp. 8861-8864, May 2013 ACS Publications; www.acsami.org.
Zhaoxiang Zhong, Weihong Xing and Bingbing Zhang Fabrication of Ceramic Membranes With Controllable Surface Roughness and Their Applications in Oil-Water Separation; SciVerse ScienceDirect; Ceramics International, vol. 39, (2013), pp. 4355-4361 www.sciencedirect.com.
Suhao Wang, Mei Li and Qinghua Lu (School of Chemistry and Technology, State Key Lab of Metal Matrix Composites, Shanghai Jiao Tong University, Shanghai 200240, P.R. China) Filter Paper with Selective Absorption and Separation of Liquids That Differ in Surface Tension Applied Materials & Interfaces, vol. 2, No. 3, pp. 677-685, Mar. 2010 www.acsami.org.

* cited by examiner

HIGHLY SELECTIVE, ULTRALIGHT, ELECTRO-SPUN FILTER MEDIA FOR SEPARATING OIL-WATER MIXTURES

CROSS REFERENCE

This application claims priority to and the benefit of U.S. Provisional Patent Application Ser. No. 62/189,571, filed Jul. 7, 2015, which is herein incorporated in its entirety by reference.

BACKGROUND OF THE INVENTION

Field of the Invention

This invention relates generally to filter media, and more particularly to development and characterization of ultralight-weight highly selective filter media for oil-water mixtures.

Description of the Related Art

Undesirable oil-water mixtures, which can occur both as unstable and stable emulsions, are very common in the oil refining industry and as well as in the environment. While oil-water emulsions may be beneficial to the pharmaceutical, paints and pigments and allied industries, it is often a nuisance to the oil and gas industry. Crude oil flowing from the well can contain over 90% water depending on the stage of production and well formation characteristics. Also, during refining of natural gas and crude oil, reaction water is produced in some of the processing units, which often needs to be separated from the valuable products either to protect downstream units or to obtain on-spec products. Also, oily waste water from production platforms and/or the refineries need to be treated before discharge to the environment in order to protect the environment and comply with applicable regulations. The tremendous economic loss, environmental issues, and ecological hazards associated with oil-water mixtures lead to the growing demand for separation of oil-water mixtures. Separation of oil-water mixtures has been carried out by various methods and means. One of the most efficient, yet challenging, methods for separating oil-water mixtures is membrane filtration. Membrane separation processes are governed by physical and chemical phenomena such as size exclusion, adsorption, surface chemistry, flow through porous media, interfacial phenomena, fluid/solid interaction, hydrophobicity, hydrophilicity, oleophilicity, oleophobicity, to mention a few. Proper selection of the properties of the filter media is critical to a successful oil/water separation operation, i.e. attractive and repulsive forces at the surface charges.

Filter media for oil-water separation have been produced by various methods. Sorbent materials (such as kapok fibers) packed in chromatography columns, sorbent sponges, hydrogels, ceramic membranes, polymer grafted materials, and coated metal meshes with special wettability features are some of the commonly investigated examples of materials for separating oil-water mixtures.

In the case of membranes produced for filtration of oil-water mixtures, properties such as pore size, porosity and fluid-membrane interaction physically affect the separation efficiency of the material. Generally, the smaller the pore sizes, the higher the separation efficiency; and the higher the porosity, the higher the permeate flow rate will be. Therefore, filter media with smaller pore sizes and higher porosity are preferred. In this sense, nanofilters are preferred over ultrafilters, and ultrafilters over microfilters. The main objectives for development and improvement of nanofiber based filter media include lower energy consumption, longer filter life, high filtration capacity, and easier maintenance.

Based on the foregoing, it is desirable to provide a nanofilter media that separates oil from oil-water mixtures, water from oil-water mixtures, and water and oil droplets from wet gas.

It is further desirable for the surface wettability of the filter media to be adjusted by surfactant treatment.

SUMMARY OF THE INVENTION

In general, the invention relates to a filter medium for oil-water separation, the filter medium comprising a composite, nanofibrous mat formed from electrospinning a single solution of one natural polymer and one synthetic polystyrene polymer together, where fibers of the natural polymer are reinforced by fibers of the synthetic polystyrene (PS) polymer. The fibers of the natural polymer may comprise a cellulose-based material such as cellulose acetate (CAc). The mat may have a hydrophobic and oleophilic surface wettability for separating oil from oil-water mixtures, and the filter medium may further comprise one surfactant added to change the surface wettability of the mat from hydrophobic and oleophilic to hydrophobic and oleophobic for separating oil and water droplets from wet gas. The one surfactant may comprise one or more short-chain fluorosurfactants. The one surfactant may consist of PHOBOL® and the filter medium may be both hydrophobic and oleophobic.

Alternately, the filter medium may further comprise a combination of two surfactants added to change the surface wettability of the mat from hydrophobic and oleophilic to hydrophilic and oleophobic in order to prepare a filter medium for separating water from oil-water mixtures. At least one of the surfactants may comprise one or more short-chain fluorosurfactants. The nanofibrous mat may be treated with a surfactant comprised of a 50:50 PHOBOL-ULTRAPHIL mixture to form a filter medium that is both hydrophilic and oleophobic.

The invention further relates to a method of making a filter medium for oil-water separation, the method comprising: electrospinning a single solution of one natural polymer and one synthetic polystyrene polymer together to form a composite, nanofibrous mat that is hydrophobic and oleophilic; drying the nanofibrous mat; and applying at least one surfactant to the hydrophobic and oleophilic, nanofibrous mat to form a hydrophilic and oleophobic or hydrophobic and oleophobic filter media. The natural polymer may be CAc. The electrospinning may be conducted at a voltage of between 10 and 50 kV, better between 15 and 35 kV and preferably about 20.0 kV, a feed rate of approximately between 2 and 60 µL/min, better between 10 and 40 µL/min and preferably 35.00 µL/min, a distance of between 15.0 and 20.0 cm, an ambient humidity of between 20% and 65%, and an ambient temperature of between 20° C. and 25° C. Drying the nanofibrous mat may comprise overnight air drying for up to 24 hours. The method may further comprise heating the nanofibrous mat at 180° C. for one hour prior to the step of applying at least one surfactant. Applying at least one surfactant to the nanofibrous mat may comprise completely saturating the nanofibrous mat with at least one surfactant. The method may further comprise blowing air directly through the filter medium for five minutes and/or allowing the filter medium to air dry overnight after applying at least one surfactant, either with or without heating the filter medium at up to 120° C. for 10 minutes after allowing the filter medium to air dry overnight. At least one surfactant may consist of PHOBOL® and the hydrophobic-oleophilic mat may become a hydrophobic-oleophobic filter media. Alternately, at least one surfactant may comprise a 50:50 PHOBOL-ULTRAPHIL mixture and the hydrophobic-oleophilic mat may become a hydrophilic-oleophobic filter media.

BRIEF DESCRIPTION OF THE DRAWINGS

The patent application file contains at least one drawing executed in color. Copies of this patent or patent application publication with color drawings will be provided by the Office upon request and payment of the necessary fee.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to an ultralight-weight highly selective filter media for separating oil-water mixtures. Depending on the surfactant treatment applied to the filter media, it may separate clean oil from oil-water mixtures, clean water from oil-water mixtures, or oil and water droplets from wet gas. The invention further relates to a method of making the filter media.

Figure 1:
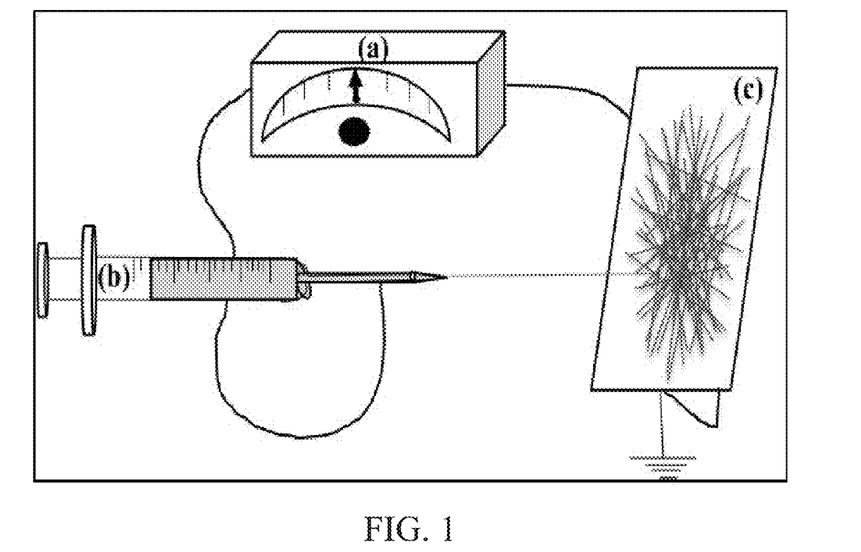
FIG. 1 is a view of a typical electrospinning arrangement.
Figure 2:
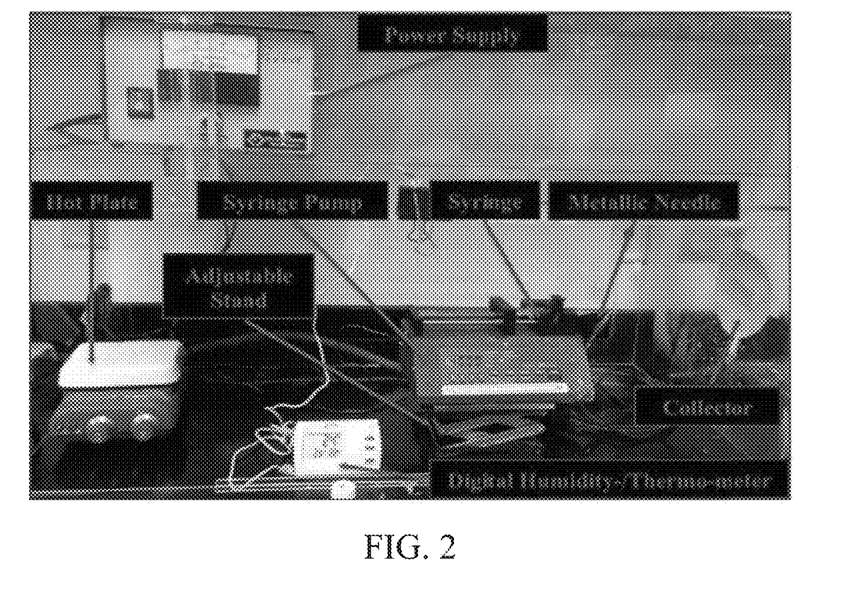
FIG. 2 is a view of the electrospinning arrangement used to produce filter media of the present invention.

To produce materials that can be used both for laboratory and industrial applications, the feasibility, scalability, and cost effectiveness of the production methods may be considered. A qualified method, which satisfies these requirements for producing nanofibrous materials, is electrospinning. In electrospinning, a high voltage may be applied to a polymer solution while the solution is driven out of a metallic needle attached to a syringe placed in a syringe pump, as shown in FIGS. 1 and 2. This high voltage electric field may charge the polymer molecules in the solution so that they are aligned and a solution jet forms between the needle tip and a grounded metal collector in front of the needle. The electric field voltage may be high enough to overcome the viscosity and surface tension of the specific polymer solution so that a steady cone structure called "Taylor's Cone" forms at the needle tip and eventually a solution jet ejects from the apex of this Taylor's Cone. As the solution jet travels the distance between the needle tip and the collector, the solvent may evaporate and finally the polymer molecules may collect in forms of nano-scale fibers on the surface of the collector.

For filtration applications, it is desirable to control the morphology of the electrospun matter to obtain highly porous materials with specific surface topologies. Specific surface topologies can significantly determine the wetting processes or the adsorption behavior of electro spun materials.

Generally, the filter media of the present invention may be produced by electrospinning composite nanofibrous mats of a natural polymer and a synthetic polymer combined together so that the fibers of the synthetic polystyrene polymer reinforce the fibers of the natural polymer, then post-treating the mats with commercially available low-cost surfactants. The natural polymer may be cellulose-based material, such as cellulose acetate (CAc). The resulting filter media may be ultra-lightweight (low basis weight) yet durable, highly flexible, highly porous, self-sufficient, and selective filter media for oil-water mixtures and wet gas.

Electrospinning may be conducted at a voltage of between 10 and 50 kV, better between 15 and 35 kV and preferably about 20.0 kV, a feed rate of between 2 and 60 µL/min, better between 10 and 40 µL/min and preferably approximately 35.00 µL/min, a distance of between 15.0 and 20.0 cm, an ambient humidity of between 20% and 65%, and an ambient temperature of between 20° C. and 25° C., or other suitable conditions. After electrospinning, the nanofibrous mat may be dried, such as by overnight air drying, heating the mat, other suitable method, or a combination thereof. For example, the mat may be heated at 180° C. for one hour.

The mat may initially have a hydrophobic and oleophilic surface wettability prior to surfactant treatment. Thus, the untreated filter media may be suitable for use in separating oil from oil-water mixtures.

The mat may be treated with a surfactant to change the surface wettability of the mat from hydrophobic and oleophilic to hydrophobic and oleophobic, making the resulting filter media suitable for use in separating oil and water droplets from wet gas. The surfactant may include one or more short-chain fluorosurfactants, such as PHOBOL, or other suitable surfactant.

Alternately, the mat may be treated with one or more surfactants to change the surface wettability of the mat from hydrophobic and oleophilic to hydrophilic and oleophobic, making the resulting filter media suitable for use in separating water from oil-water mixtures. The surfactants may specifically include two surfactants, one of which may include one or more short-chain fluorosurfactants and the other is a poly (siloxane) surfactant. For example, the mat may be treated with a 50:50 PHOBOL-ULTRAPHIL mixture to make the resulting filter media both hydrophilic and oleophobic.

After applying the surfactant, the filter medium may be dried by blowing air directly through the filter medium for five minutes, by air drying the filter medium overnight up to 24 hours, by heating the filter medium, by other suitable method, or by a combination thereof. For example, the filter medium may be allowed to air dry overnight and then be heated at 120° C. for 10 minutes.

EXAMPLE

By way of example, 10% w/w CAc+10% w/w PS blend solution in N,N'-dimethyl formamide (DMF) was prepared. This solution was electrospun into nanofibrous membranes by using the electrospinning setup shown in FIG. 1 and under the following settings:

| Variable | Setting |
| --- | --- |
| Voltage | 20.0 kV |
| Feed Rate | 35.00 μL/min |
| Distance | 15.0-20.0 cm |
| Humidity | Room (20%-65%) |
| Temperature | Room (20° C.-25° C.) |

The electrospinning settings were optimized by visual inspection and also studying SEM images of samples electrospun at various settings while varying control parameters, one at a time, at certain increments.

Figure 3:
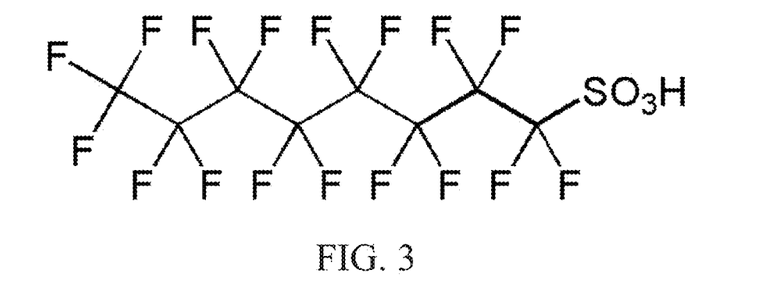
FIG. 3 is a 2D molecular skeletal structure of a fluorosurfactant.
Figure 4:
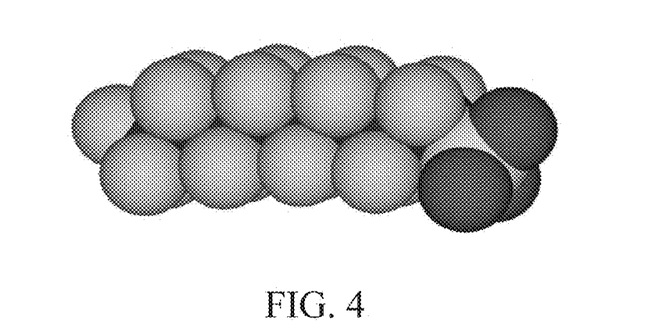
FIG. 4 is a 3D molecular space filling model of a fluorosurfactant.

Filter #1 samples were prepared by heating these electrospun materials at 180° C. for 1 hour after allowing them to dry in air, overnight. Two commercially available surfactants from Huntsmann Textile Company (DuPont, Inc.) named PHOBOL® and ULTRAPHIL® were used to modify the surface chemical properties of Filter #1 samples to produce Filters #2 and #3. PHOBOL® is the trade name for fabric finishes sold by Huntsman Textile Company in which the main ingredients are Capstone® repellents and stain-release Teflon fabric protectors produced by DuPont. Capstone® repellents and textile protectors are a broad portfolio of sustainable, performance-driven, fluorine efficient short-chain fluoro-surfactants. Fluorosurfactants are a class of surfactants containing a fluorinated hydrocarbon tail and a nonpolar, polar, or ionic head group, shown in FIGS. 3 and 4. Fluorosurfactants can reduce surface tension of water twice as much as conventional hydrocarbon surfactants and significantly repel oil from surfaces. However, their use must be limited to short-chain counterparts to avoid environmental and ecological toxicity and meet environmental protection standards. The Huntsman PHOBOL® CP range products meet the requirements of the U.S. Environmental Protection Agency's 2010/15 Perfluorooctanoic acid Stewardship Program. The PHOBOL® product used in this work was PHOBOL® CP-C, however, it will be referred to as PHOBOL® herein. PHOBOL® CP-C is a dispersion of a cationic fluoro-acrylate copolymer. UILTRAPHIL® is the trademark for another series of DuPont textile surfactant products sold by Huntsmann, which are used as hydrophilic fabric softeners. It has been suggested by the Huntsmann Company that a mixture of PHOBOL® and ULTRAPHIL® can be used for hydrophilic removal of oil stains from fabrics. However, the ratio of this mixture that provides highest degree of hydrophilicity and oleophobicity has not been stated. Therefore, the first step for preparing the proposed hydrophilic-oleophobic filter media of this work was to determine the most efficient ratio of PHOBOL-ULTRAPHIL mixtures. Varying ratio mixtures of PHOBOL® and UILTRAPHIL® were prepared in separate vials and vortexed. These surfactant mixtures were each pipetted and dispensed on individual samples (prepared by the same procedure as Filter #1) so that the membrane surface was completely saturated. The wet membranes were left to dry overnight, at room temperature, in air; and then heated in the oven at 120° C. for 10 min. The PHOBOL-ULTRAPHIL ratio that modified the wettability of the surface to the highest hydrophilicity-oleophobicity difference was determined by static water and oil droplet contact angle measurements using an AST VCA Optima Goniometer. Filter #2 was prepared by adding this surfactant mixture to Filter #1 samples and following the drying procedure explained above. To prepare Filter #3, only PHOBOL® was added as surfactant to Filter #1 samples. Other than the surfactant, the procedure for preparing Filter #3 was the same as Filter #2.

To produce Filter #2 and Filter #3 samples, heated materials produced as Filter #1 samples were saturated with PHOBOL-ULTRAPHIL (50:50) surfactant mixture and pure PHOBOL® surfactant respectively, then heated in oven at 120° C. for 10 minutes after blowing air directly through the samples for 5 minutes and allowing them to dry in air, overnight. Air was blown through the samples to remove any excess surfactant filling the pores of the samples.

Once the filters were produced, they were characterized by several characterization tests. SEM and AFM were used to scan surface morphology and topology of the media respectively. Crystallography was carried out by XRD. Infrared (IR) spectroscopy was used to identify the chemical compositions of the media. TGA investigated thermal stability of the media. The pore size, pore size distribution, and porosity of each filter media were determined. Finally, the wettability of the media towards water and different oils was quantified by contact angles measured by goniometry.

The surface morphology of filter media was studied from AFM by a MultiMode 5 atomic force microscope and SEM images by an INSPECT S50, FEI scanning electron microscope. AFM was conducted in tapping mode and phase images showed the topology and surface roughness of the media. Since the samples were not electronically conductive, they were coated with a thin layer of platinum-gold alloy by a SC7620 Polaron Range sputter coater prior to SEM. SEM images showed the surface structure including a rough estimate of pore sizes and pore size distribution, porosity, fiber structures, and fiber dimensions for electrospun fibrous membranes. The topology and overall structural features of filter media determine the physical contribution of the media to its filtration performance.

Crystallography provides information regarding the crystallinity of the filter media and the packing of its unit cells. This was carried out by XRD crystallography. For polymeric materials crystallography is more complex and ideally should demonstrate packing aspects of neighboring polymer molecular chains or different atoms within one molecular chain. A SmartLab X-Ray Diffractometer was used and set to plot the intensity of diffracted X-Rays from each sample versus the diffraction angle (θ). The XRD profiles for each filter media were investigated, where broad peaks implied amorphous structure and sharp peaks represented crystalline structure. It was expected that the packing properties of CAc and PS change either due to electrospinning or chemical treatment with surfactants. Since crystalline structures are more brittle than amorphous structures, in the case of electrospun materials for use as filter media it is preferred that they be amorphous rather than crystalline so that they would be more durable under high pressures and mechanical forces.

The chemical composition of the filter media was determined by Fourier transfer infrared (FT-IR) spectroscopy using an AVATAR FT-IR spectroscope equipped with a Multi-Bounce Crystal HATR. For IR spectroscopy each sample was placed one at a time on the surface of a crystal from which a bouncing IR beam hit the sample several times and was reflected. The spectrum showed the percentage of the IR beam that was reflected by the sample versus its wavenumber. The reflection % is identical to transmission % and can be converted to absorption %. The IR absorption spectra were collected for each sample and studied to determine the effects of electrospinning and presence of other chemicals on the chemical composition of each sample.

Thermal stability of the media was determined by TGA. For TGA a small amount of sample (~10.00 mg-15.00 mg) was used. The sample was heated from 40° C. up to 800° C. until it completely degraded. A TGA plot shows the weight percentage of a sample versus heating temperature. The first derivative of a TGA plot equals $T_{max}$, which is the highest temperature that a sample can withstand without thermal degradation. Above $T_{max}$ the sample starts to degrade gradually as the heating temperature increases. The second derivative of a TGA plot calculates $T_{onset}$, which is the temperature of the inflection point of the plot.

Samples of the filter media were sent to Quantachrome Materials' Characterization Laboratory (Quantachrome Instruments, Lab QMC, Boynton Beach, Fla., USA) to determine their pore sizes and pore size distribution of the filter media by mercury capillary flow porometry via Quantachrome porometer.

To measure density, pore volume and porosity of the filter media, for each measurement, five 1-inch$^2$ samples of each medium were cut using a ruler and scissors, their thickness was measured with a caliper, and their volumes were calculated. The density of each filter media was calculated by averaging mass-to-volume ratios of five 1-inch$^2$ samples of the medium. To measure the porosity of the filter media samples were saturated with a wetting liquid of known density and weighed. The wet samples were dried in a vacuum oven for 10 minutes and the dried samples were weighed. The pore volume and the porosity of each sample were calculated using the following equations:

$$V_{Pore} = (m_{wet\ sample} - m_{dry\ sample}) d_{wetting\ liquid}$$

$$\%\ \text{Porosity} = \left(\frac{V_{Pore}}{V_{Sample}}\right) \times 100$$

The wettability of the media towards water and different oils was characterized by goniometry using a VCA optima goniometer (AST, Inc.) and software. Static and dynamic water and oil droplet contact angle measurements were carried out. For static contact angle measurements, a 1.00 μL liquid droplet was dispensed onto the surface of the media and its right and left contact angles with the surface were measured and averaged. 10 such measurements were made for each sample at 10 random positions. The total average was reported as the specific liquid (water or oil) droplet contact angle for the medium under study. Comparisons between chemically untreated and surfactant treated samples, through plotted data, revealed the effects of each surfactant and surfactant mixtures on the wettability of the electrospun membranes.

Furthermore, time-dependence of liquid droplet contact angle was investigated by dynamic contact angle measurements to analyze water and oil droplet retention times for each filter medium. A 1.00 μL liquid droplet was dispensed onto the surface of the media and its variation with time was captured dynamically for 30 minutes. The right and left average contact angles of the droplet were measured every minute. This was repeated at five randomly selected positions of one sample for each media. The averages of liquid droplet dynamic contact angles at each minute for the five droplets were plotted versus time.

The contact angle of a sequence of droplets deposited and removed at a single position may also vary. Therefore, a sequence of 10 droplets were deposited and removed one at a time with 60 s intervals; and their contact angles were measured. The same dynamic contact angle measurements were carried out at 5 random positions of each sample and the average of contact angles for first, second, third, to tenth droplet at each position was reported.

Permeation flux of liquids through a filter media is another property that should be determined. Five mL of pure water or oil or oil-water mixtures is poured on top of the filter media. The volume of liquid passed through the filter media in a certain time is measured in the graduated cylinder. The permeation flux is then calculated using the following equation:

$$\mathcal{F} = \frac{V_{permeate}}{A * \Delta t}$$

where Vpermeate is the volume of the liquid passed through the filter media (permeate), A is the effective cross section area of the filter media and Δt is the time in which the liquid passes through the filter media.

Surface topology of filter media may play an essential role in adsorption/absorption or repellence of liquids. Hydrophobicity usually increases with increase in roughness of filter media surfaces. AFM phase diagrams acquired of the three developed filter media presented here show that Filter #2 has a smoother surface as compared to Filters #1 and #3. Thus, Filter #2 must be more hydrophilic than Filters #1 and #3.

Figure 5:
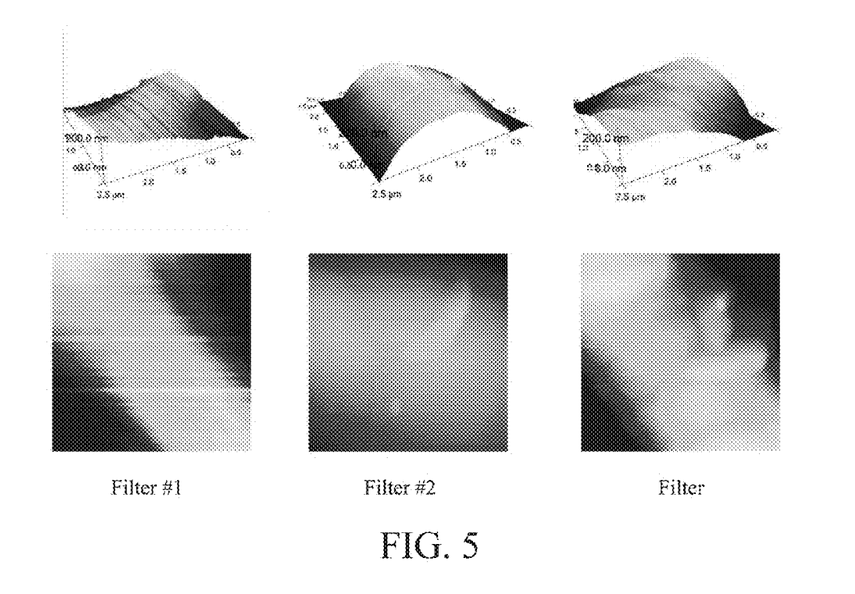
FIG. 5 is Atomic Force Microscopy (AFM) phase diagrams and images of sample Filters #1, #2, and #3.

As explained previously, Filter #2 is indeed Filter #1 treated with a 50:50 PHOBOL-ULTRAPHIL surfactant mixture, while Filter #3 is Filter #1 treated with pure PHOBOL® surfactant. Consequently, the relative smoothness of the surface of Filter #2 can be attributed to the presence of ULTRAPHIL®. The AFM phase diagrams and images of Filters #1, #2, and #3 may be seen in FIG. 5.

Figure 6:
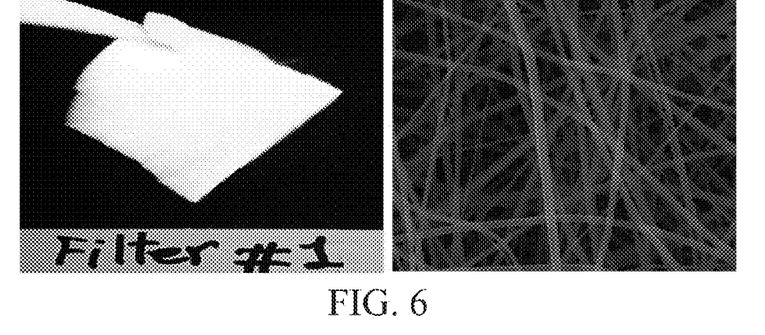
FIG. 6 is a photograph of Filter #1 and its Scanning Electron Microscopy (SEM) image.
Figure 7:
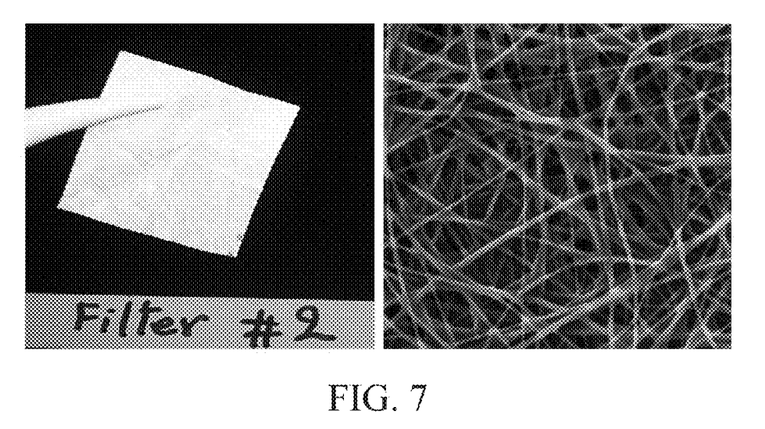
FIG. 7 is a photograph of Filter #2 and its SEM image.
Figure 8:
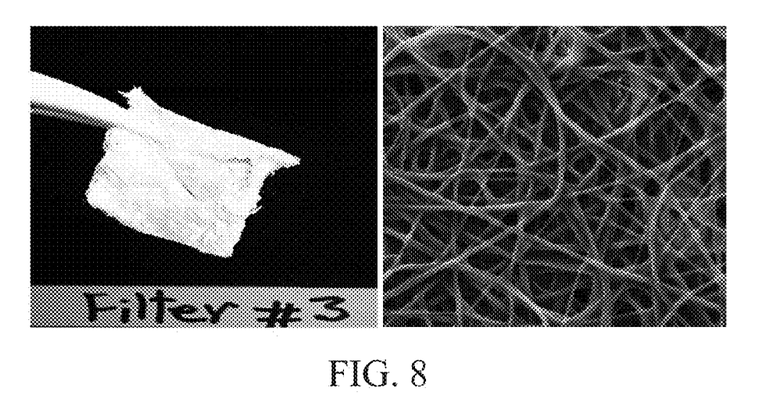
FIG. 8 is a photograph of Filter #3 and its SEM image.

Investigations on fiber dimensions, fiber density, pore sizes, porosity, and overall morphology of untreated and surfactant-treated electrospun materials, i.e. Filters #1, #2 and #3 respectively, by studying SEM images revealed that electrospun CAc-PS composite membranes consisted of very fine nano-scale (21.4 nm-113.5 nm) fibers and were highly porous with nano-scale pores. Moreover, surfactant treatment did not disrupt the nanofibrous structure of the electrospun membranes and the membranes remained highly porous. FIGS. 6 through 8 show photographs of samples of Filters #1, #2, and #3, respectively, along with their SEM images. The membrane density, pore size, pore volume, and porosity of Filters #1, #2 and #3 (625 mm$^2$ area×0.1 mm thick samples) measured using capillary flow porosimetry by Quantachrome Laboratories (LabQMC, Boynton Beach, Fla.) are shown below:

| Filter Media | Membrane Density (g/cm$^3$) | Pore Size* (μm) | | | Total Pore Volume (μm$^3$) | Porosity (%) |
|---|---|---|---|---|---|---|
| | | Min | Mean | Max | | |
| #1 | 0.17 ± 0.02 | 26.67 | 32.49 | 48.86 | 3.0 × 10$^9$ | 96.0 ± 2.7 |
| #2 | 2.00 ± 0.03 | 0.41 | 21.27 | 1064.39 | 5.9 × 10$^{10}$ | 94.1 ± 1.4 |
| #3 | 2.93 ± 0.06 | 0.10 | 13.97 | 1060.01 | 3.3 × 10$^9$ | 91.0 ± 5.3 |

Figure 9:
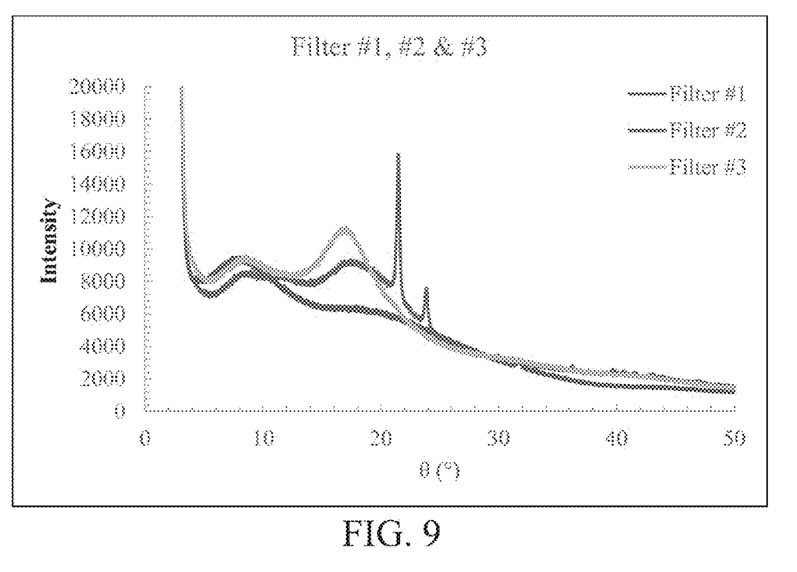
FIG. 9 is a chart showing the X-Ray Diffraction (XRD) profiles of Filters #1, #2, and #3.
Figure 10:
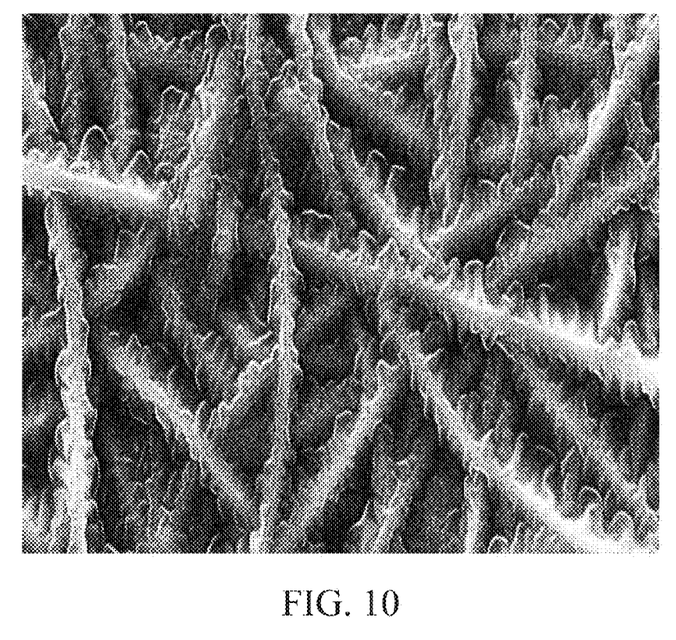
FIG. 10 is an image of the electrospun CAc-PS composite membrane treated with ULTRAPHIL®.

XRD scans of the three developed filter media, shown in FIG. 9, were obtained to investigate crystallinity of their materials. In XRD scans, while sharp and well-defined peaks represent crystalline structures, broad peaks represent amorphous structures. Correspondingly, some crystallinity (θ=20°-25° peaks) was only observed in the XRD scan for Filter #2, while XRD scans of Filters #1 and #3 showed no crystallinity. Two broad peaks, which may correspond to amorphous electrospun CAc and PS nanofibers, appear (θ=5°-10° and θ=15°-20°) for all three media. Thus, the crystallinity observed for Filter #2 can be attributed to the presence of UILTRAPHIL® in this media. Crystallinity of ULTRAPHIL® was also proved by SEM image of ULTRAPHIL®-treated electrospun CAc-PS sample, shown in FIG. 10. It can be concluded from the relatively less broad 0=15°-20° peak in the XRD scan of Filter #2 and much less broad 0=15°-20° peak in the XRD scan of Filter #3 that PHOBOL® only slightly enhances crystallinity.

Figure 11:
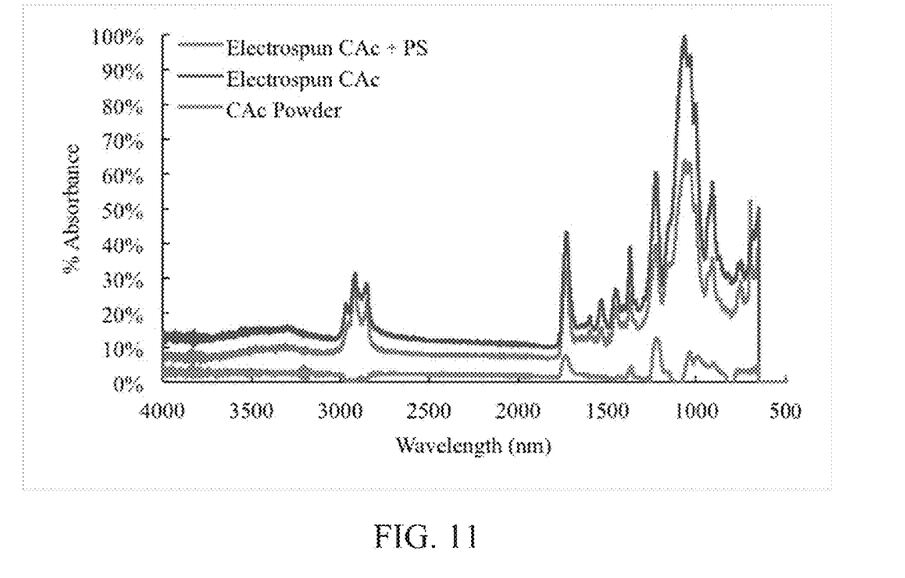
FIG. 11 is a chart showing the Infrared (IR) spectra of CAc powder, electrospun CAc membrane and electrospun CAc-PS composite membrane.
Figure 12:
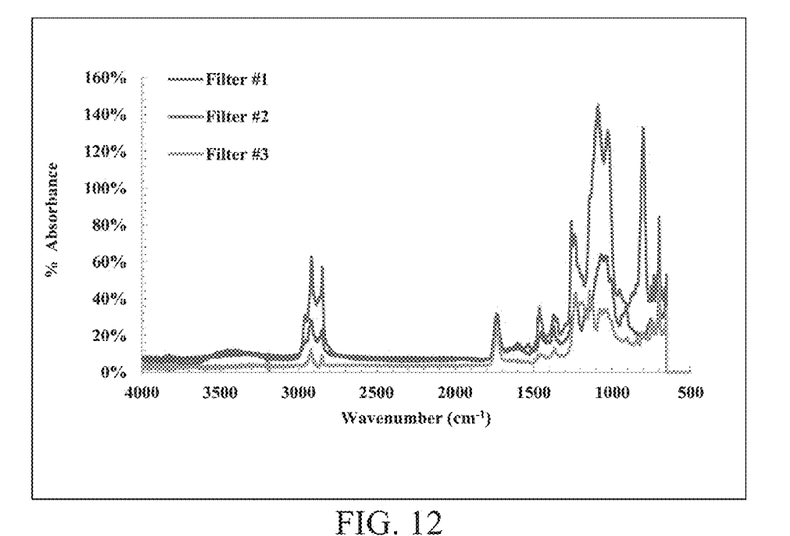
FIG. 12 is a chart showing IR spectra of Filters #1, #2, and #3.

Any shift in the wavenumbers of significant peaks of IR spectra of samples, from one sample to another, indicates change in chemical compositions. The overlap of electrospun pure CAc and electrospun CAc-PS IR spectra and comparison with CAc powder spectrum, shown in FIG. 11, indicated that in the composite CAc-PS sample, no reaction had taken place between CAc and PS to produce new product(s) and make any chemical changes. In other words, CAc and polystyrene fibers had electrospun distinctly. By the same concept, comparison between IR spectra of the three filter media, shown in FIG. 12, revealed that PHOBOL® and ULTRAPHIL® surfactants merely physically adhere to the electrospun CAc-PS fibers and do not chemically react with these fibers.

Figure 13:
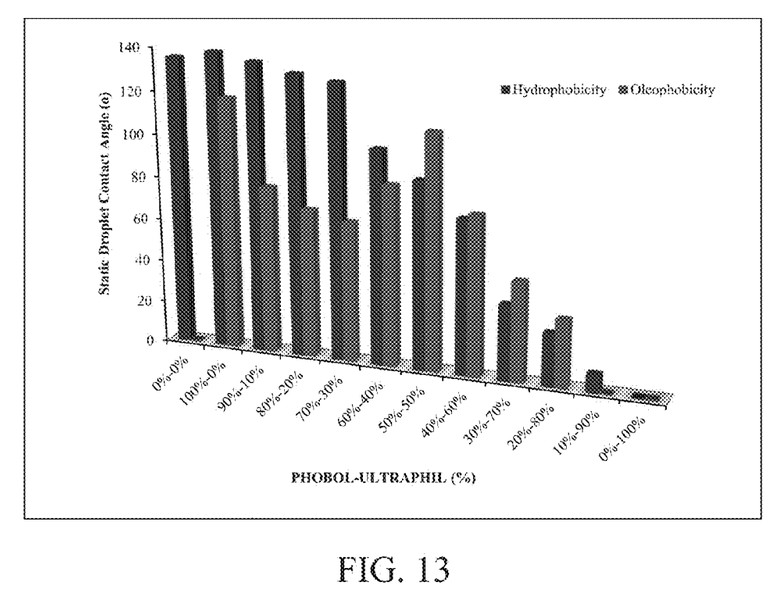
FIG. 13 is a chart showing the effects of PHOBOL® and ULTRAPHIL® on hydrophobicity and oleophobicity of Sample #2.

Static contact angle measurements of water droplets and oil droplets showed that PHOBOL® increased hydrophobicity and oleophobicity while ULTRAPHIL® decreased hydrophobicity and oleophobicity. The PHOBOL-ULTRAPHIL ratio in the mixed surfactant system was optimized to produce hydrophilic-oleophobic filter media (Filter #2) with highest possible efficiency as a result of largest difference between water droplet contact angle and oil droplet contact angle. Addition of a 50:50 PHOBOL-ULTRAPHIL surfactant mixture to Filter #1 samples resulted in filter media with the optimized hydrophilic-oleophobic property (Filter #2), as seen in FIG. 13.

Figure 14:
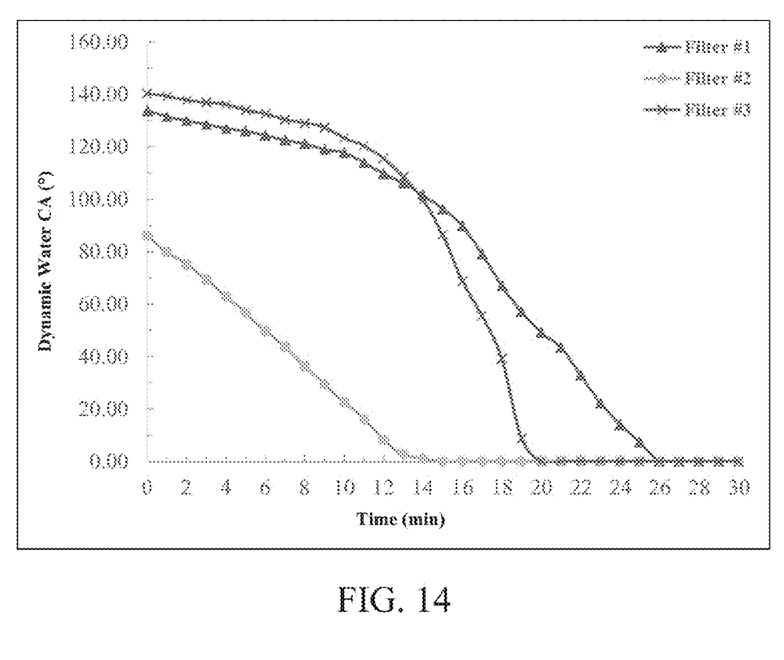
FIG. 14 is a chart showing water droplet retention of Filters #1, #2, and #3.
Figure 15:
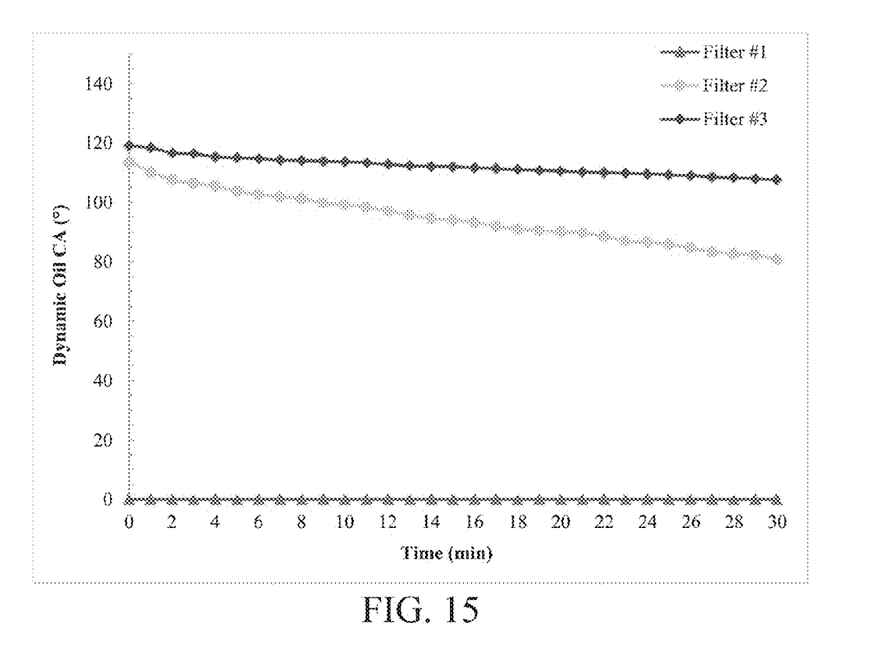
FIG. 15 is a chart showing oil droplet retention of Filters #1, #2, and #3.

Dynamic droplet contact angle measurements revealed the time (t') at which a droplet of liquid (oil or water) starts penetrating a filter medium under the influence of gravity and the total time (t") in which the droplet could be retained by a filter medium before it is completely absorbed into the medium. The liquid retained on the surface of the filter medium must be removed prior to t', so that any penetration of the retained liquid is prevented. FIGS. 14 and 15 respectively show the water droplet and oil droplet retention times for all three filter media.

Figure 16:
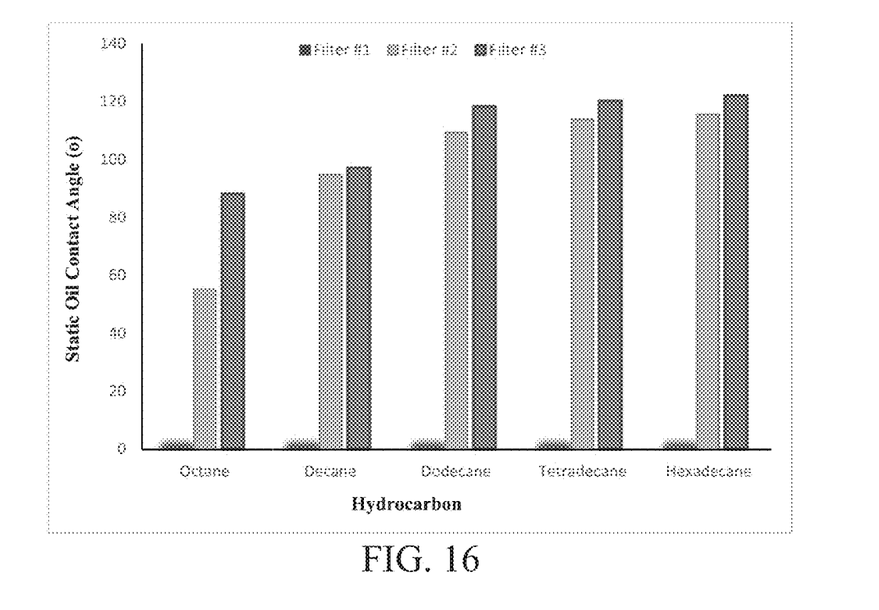
FIG. 16 is a chart showing wettability of Filters #1, #2, and #3 towards various hydrocarbons.

Oleophobicity of a surface towards oils varies due to difference in surface tension and viscosity of oils. Static oil contact angle measurements conducted by using five hydrocarbons differing in their surface tension and viscosity values showed that Filter #1 remained super-oleophilic towards all hydrocarbons. The same measurements for Filter #2 and Filter #3 showed increase in oleophobicity with increase in surface tension and viscosity, as seen in FIG. 16.

Figure 17:
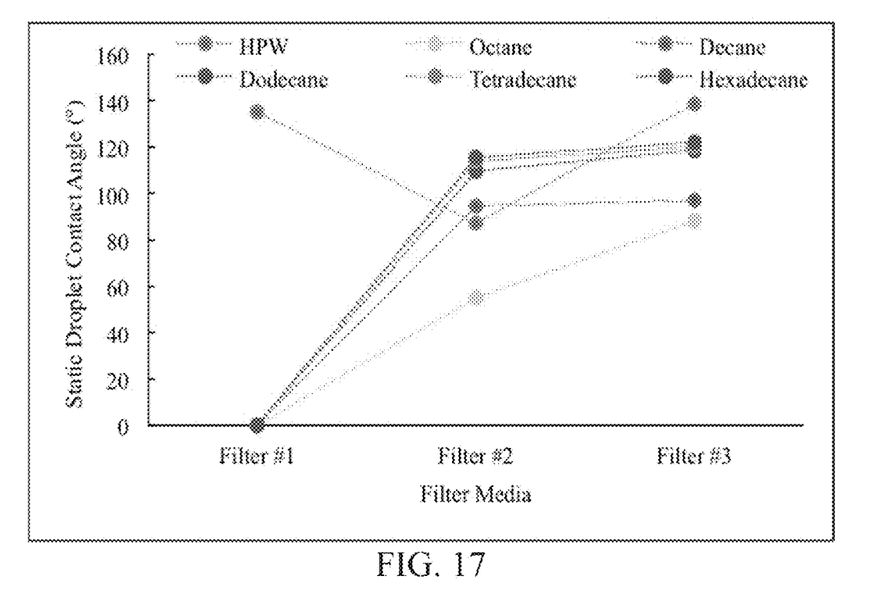
FIG. 17 is a chart showing hydrophobicity and oleophobicity of Filters #1, #2, and #3.

Finally, a comparison of static water and oil droplet contact angles for each filter media was carried out to determine their separation performance capabilities. In FIG. 17, the results of these comparisons are shown, which besides the hydrophobicity and oleophobicity of each filter media, the changes in hydrophobicity and oleophobicity from one filter medium to another are plotted.

A zero contact angle shows the complete absorption of a liquid by a filter medium, while small contact angles show partial absorption. As the contact angle of a liquid increases the extent of absorption decreases and the liquid droplet is adsorbed rather than absorbed. A contact angle above 90° was said to indicate hydrophobicity, i.e. water repellence. Although determination of oleophobicity is not so straightforward and no specific angle has been reported for oleophobicity, we considered the same angle (90°) as an indicator for oleophobicity. Above a 90° contact angle the liquid with larger contact angle is the liquid, which is more repelled by a filter medium. To achieve separation between water and oil, one liquid (water or oil) must have a contact angle above 90° and the other liquid (water or oil) must have a contact angle below 90°. For Filters #1 and #2 the larger the difference in contact angles of water and oil, the better their separation by filtration can be carried out. For Filter #3 higher contact angles of water and oil droplets above 90° ensure more efficient separation of water and oil droplets from wet gas.

According to FIG. 17, Filter #1 can filter octane, decane, dodecane, tetradecane, hexadecane and any oil with similar properties to these hydrocarbons from their mixture with water; Filter #2 can filter water from its mixtures with decane, dodecane, tetradecane, hexadecane and any oil with similar properties to these hydrocarbons, but not from a water-octane mixture or its mixture with oils with the same or lower surface tension or viscosity as octane; and Filter #3 can separate droplets of water and decane, dodecane, tetradecane, hexadecane and any oil with similar properties to these hydrocarbons from a wet gas.

Figure 18:
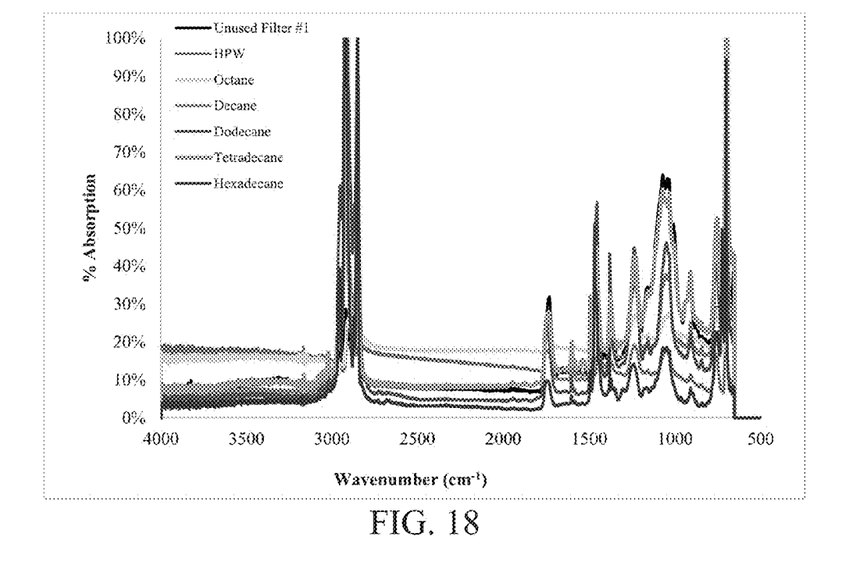
FIG. 18 is a chart showing IR spectra of Filter #1 before and after exposure to high purity water and hydrocarbons.
Figure 19:
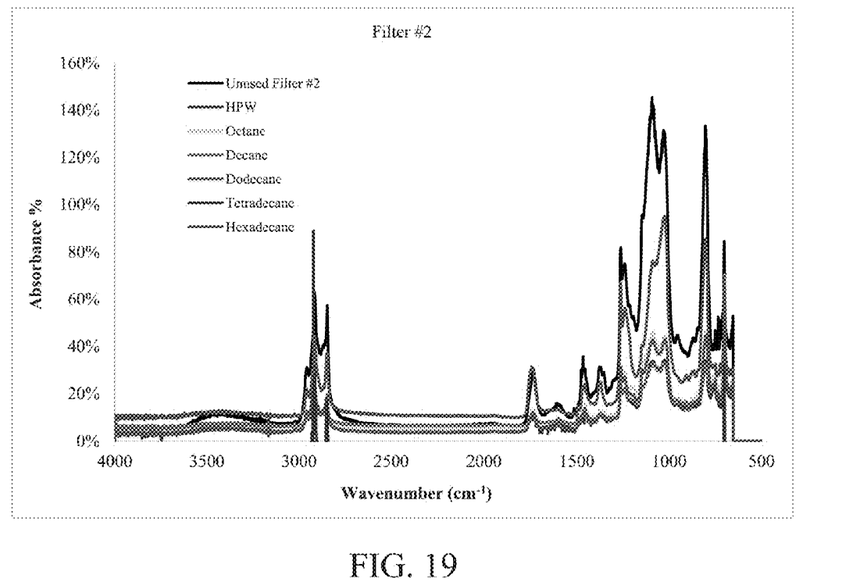
FIG. 19 is a chart showing IR spectra of Filter #2 before and after exposure to high purity water and hydrocarbons.

Any shift in the wave number of the peaks of IR spectra of used samples from the original unused sample would indicate change in chemical composition of the filter media material, as a result of chemical reaction with water or the hydrocarbons used. Comparison of IR spectra of samples of filter media #1 an #2 exposed to water (HPW), decane, dodecane, tetradecane, and hexadecane with unused samples of filter media #1 and #2 showed that the chemical composition of the filter media would not alter in the filtration process due to any chemical reaction between water or hydrocarbons and the filter media during filtration processing. FIGS. 18 and 19 integrate these comparative results for filter media #1 and #2 respectively.

Figure 20:
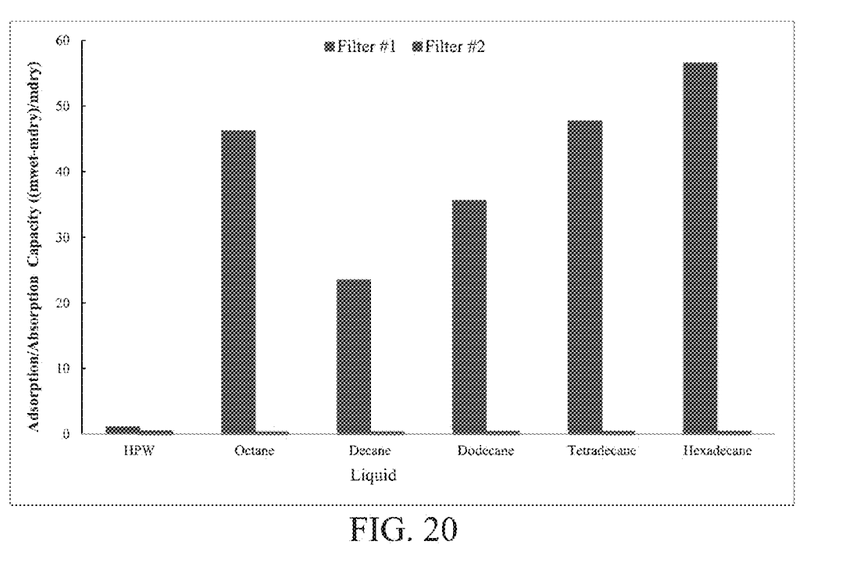
FIG. 20 is a chart showing adsorption and absorption capacity of Filter #2 vs. Filter #1.

Measurements of the water or oil adsorption/absorption capacity of Filter media #1 and #2 showed the maximum amount of each liquid that could be adsorbed/absorbed by the filter medium. Based on these measurements Filter #1 only slightly adsorbs water but highly absorbs the hydrocarbons. The results obtained for octane were not very reliable since octane was too volatile for carrying out precise measurements. For the other hydrocarbons it was observed that the oil adsorption/absorption capacity of Filter #1 increased with increase in oil density, as seen in FIG. 20. Filter #2 did not show any significant adsorption/absorption for water nor any of the hydrocarbons. This could indicate that in a filtration process by Filter #2 the liquids are either retained on the surface of the filter medium or filtered through the filter medium, so since Filter #2 is hydrophilic and oleophobic oil would be retained and water would permeate and none will be adsorbed/absorbed. In FIG. 20, the results shown for Filter #2 are exaggerated for visual purpose.

Figure 21:
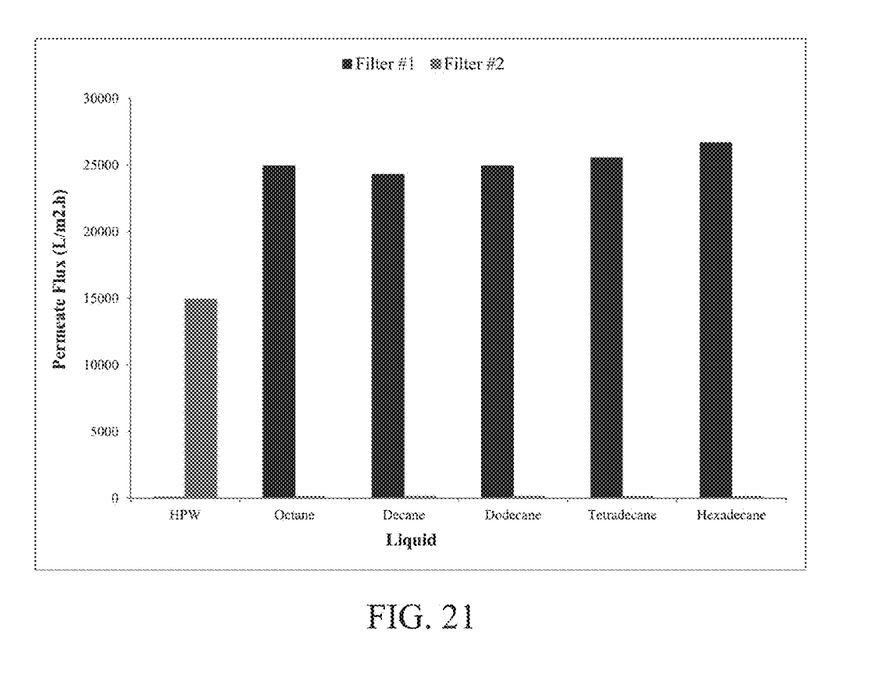
FIG. 21 is a chart showing permeate flux of Filter #2 vs. Filter #1.

The permeate flux through a filter media determines the filtration processing rate and affects the overall filtration efficiency. Too small pore sizes can tremendously increase drag forces against the flow of permeate through the medium and decreases permeate flux. While larger pore sizes are in favor of higher permeate flux, they lead to decrease in filtration selectivity. Therefore, a balance between permeate flux and filtration selectivity through pores with moderate sizes is most preferable. The results obtained for permeate fluxes of pure water, octane, decane, dodecane, tetradecane and hexadecane through filter media #1 and #2 are shown in FIG. 21. In this chart not only the selectivity of the filter media in filtration, but also acceptable high permeate fluxes through the media can be seen.

In summary, the present invention provides an ultralightweight highly selective filter media for oil-water separation, where the filter medium comprises a composite, nanofibrous mat formed from electrospinning a single solution of one natural polymer and one synthetic polymer together, where fibers of the natural polymer are reinforced by fibers of the synthetic polystyrene polymer.

Whereas, the devices and methods have been described in relation to the drawings and claims, it should be understood that other and further modifications, apart from those shown or suggested herein, may be made within the spirit and scope of this invention.

What is claimed is:

1. A method of making a filter medium for oil-water separation, the method comprising:
   combining at least one cellulose acetate material and one polystyrene polymer together with an organic solvent wherein polymer chains of the cellulose acetate material are reinforced by polymer chains of the polystyrene polymer to form a homogenous single solution;
   thereafter electrospinning said homogenous single solution to form a composite, nanofibrous mat that is hydrophobic and oleophilic wherein fibers of the cellulose acetate material are reinforced by fibers of the polystyrene polymer;
   drying the nanofibrous mat; and
   applying at least one surfactant to the hydrophobic and oleophilic, composite nanofibrous mat to form a hydrophilic and oleophobic or hydrophobic and oleophobic filter media.

2. The method of claim 1 where the electrospinning is conducted at a voltage of between 10 to 50 kV, a feed rate of between 2 to 60 µL/min, a distance of between 15.0 to 20.0 cm, an ambient humidity of greater than 20%, and an ambient temperature of between 20° C. to 25° C.

3. The method of claim 1 where drying the nanofibrous mat comprises overnight air drying.

4. The method of claim 1 further comprising heating the nanofibrous mat at approximately 180° C. for approximately one hour prior to said step of applying at least one surfactant.

5. The method of claim 1 where said step of applying at least one surfactant to the nanofibrous mat comprises completely saturating the nanofibrous mat with said at least one surfactant.

6. The method of claim 1 further comprising blowing drying gas directly through the filter medium for approximately five minutes after applying at least one surfactant.

7. The method of claim 1 further comprising allowing the filter medium to air dry overnight after applying at least one surfactant.

8. The method of claim 7 further comprising heating the filter medium at approximately 120° C. for approximately 10 minutes after allowing the filter medium to air dry overnight.

9. The method of claim 1 where the at least one surfactant is a short-chain fluorosurfactant and where the hydrophobic-oleophilic mat becomes a hydrophobic-oleophobic filter medium.

10. The method of claim 1 where at least one surfactant comprises a mixture of one or more short-chain fluorosurfactants and a polysiloxane surfactant and where the hydrophobic-oleophilic mat becomes a hydrophilic-oleophobic filter medium.

11. A method of making a filter medium for oil-water separation, the method comprising:
    combining at least one cellulose acetate material and one polystyrene polymer together with an organic solvent wherein polymer chains of the cellulose acetate material are reinforced by polymer chains of the polystyrene polymer to form a homogenous single solution;
    thereafter electrospinning said single solution to form a composite, nanofibrous mat wherein fibers of the cellulose acetate material are reinforced by fibers of the polystyrene polymer;
    drying the nanofibrous mat; and
    applying at least one surfactant to the composite nanofibrous mat in order to form a hydrophilic and oleophobic filter medium.

12. The method of claim 11 where the electrospinning is conducted at a voltage of between 10 to 50 kV, a feed rate of between 2 to 60 µL/min, a distance of between 15.0 to 20.0 cm, an ambient humidity of greater than 20%, and an ambient temperature of between 20° C. to 25° C.

13. The method of claim 11 where drying the nanofibrous mat comprises overnight air drying.

14. The method of claim 11 further comprising heating the nanofibrous mat at approximately 180° C. for approximately one hour prior to said step of applying surfactant.

15. The method of claim 11 where applying at least one surfactant to the nanofibrous mat comprises completely saturating the nanofibrous mat with said at least one surfactant.

16. The method of claim 11 further comprising blowing air directly through the filter medium for five minutes after applying at least one surfactant.

17. The method of claim 11 further comprising allowing the filter medium to air dry overnight after applying at least one surfactant.

18. The method of claim 17 further comprising heating the filter medium at approximately 120° C. for approximately 10 minutes after allowing the filter medium to air dry overnight.

19. The method of claim 11 where the at least one surfactant consists of a short-chain fluorosurfactant.

20. The method of claim 11 where at least one surfactant comprises a mixture of one or more short-chain fluorosurfactants and a polysiloxane surfactant.

21. The method as set forth in claim 1 wherein said organic solvent is dimethylformamide (DMF).

22. The method as set forth in claim 11 wherein said organic solvent is dimethylformamide (DMF).

* * * * *